United States Patent

[11] 3,597,593

| [72] | Inventors | Arthur Owen Stanesby;<br>John Young Condie Montgomery; Donald Ferguson Walker, all of Edinburgh, Scotland |
|---|---|---|
| [21] | Appl. No. | 641,777 |
| [22] | Filed | May 29, 1967 |
| [45] | Patented | Aug. 3, 1971 |
| [73] | Assignee | Ferranti, Limited |
| [32] | Priority | June 4, 1966 |
| [33] | | Great Britain |
| [31] | | 24997/66 |

[54] DATA CONVERSION APPARATUS
9 Claims, 5 Drawing Figs.

[52] U.S. Cl. .................................................. 235/61.6, 318/19, 340/147, 340/172.5
[51] Int. Cl. .................................................. G06k 7/06, G06q 7/00, H01j 9/18, H04q 9/02
[50] Field of Search .................................................. 235/61.6, 61.11, 92; 340/172.5, 147; 318/20.110

[56] References Cited
UNITED STATES PATENTS

| 3,119,054 | 1/1964 | Livingston | 318/20.110 |
| 3,215,983 | 11/1965 | Kilroy | 340/147 |
| 3,308,279 | 3/1967 | Kelling | 318/20.110 |
| 3,414,787 | 12/1968 | Reuteler | 318/20.110 |
| 3,443,178 | 5/1969 | Reuteler | 318/20.110 |
| 3,479,574 | 11/1969 | Kosem | 318/20.110 |
| 3,170,143 | 2/1965 | Royston | 235/92.28 |
| 3,196,404 | 7/1965 | Furlong | 235/92.54 |
| 3,200,241 | 8/1965 | Harrison | 235/92.28 |
| 3,223,981 | 12/1965 | Fischer | 235/92.54 |
| 3,226,529 | 12/1965 | Hardy | 235/61.11 |
| 3,229,258 | 1/1966 | Heibeck | 235/92.54 |
| 3,364,340 | 1/1968 | McGarrell | 235/92.28 |

*Primary Examiner*—Daryl W. Cook
*Assistant Examiner*—Robert M. Kilgore
*Attorney*—Cameron, Kerkam and Sutton ABSTRACT: Apparatus for periodically varying in response to acceleration-representing signals from a computer the number of pulses held in a store to represent the velocity of a machine tool, and after each such variation distributing evenly over a fixed time period tool-control pulses equal in number to the number held in the store.

DATA CONVERSION APPARATUS

This invention relates to data conversion apparatus.

The invention has particular application to systems for controlling the movement of a part of a machine tool in dependence on numerical data. The part of the machine the movement of which is controlled will hereinafter be referred to for convenience as the tool, though it might very likely be the worktable or some other part. It is customary to derive such data from a general-purpose digital computer (or from a computer designed specially for curve generation) in the form of numbers representing variable increments of distance $ds$ resolved into at least two rectangular coordinates $dx$ and $dy$ through which the tool is to be moved during successive constant increments of time $dt$. Each such incremental distance amounts to a first-order difference between successive positions of the tool and therefore represents its mean velocity over the incremental time $dt$.

Where the tool has appreciable mechanical inertia, as it usually has, successive values of the incremental distances $dx$ and $dy$ will differ but slightly. On the other hand each may be large in itself. Hence a disadvantage of the arrangement just described is that much of the computer's output may comprise a sequence of large output signals each of which is but little different from a repetition of the signal before it, and these large values require relatively complex conversion apparatus for converting them to a form suitable for the control of the tool. If the computer's output signal is recorded, much of the recording medium is wasted for the same reason.

Such a computer would normally produce its output in the form a binary signal, whereas the machine tool would normally require it in some other form. A form of data that is particularly convenient is that of a train of pulses spaced approximately evenly over each time increment $dt$. Each pulse represents an incremental movement of constant length in the $x$ or $Y$ direction, as the case may be, the direction being forward or backward in dependence on the sense or some other characteristic of the pulse. Hence the number of pulses which occur during each such time period $dt$ represents the mean velocity required of the tool during the period, in other words, the first-order difference of its movement.

An object of the invention an input signal representing variable increments of distance, such as supplied by a digital computer, to data in the form of pulses of the kind described in the preceding paragraph.

A further object is to provide apparatus of that kind which does not require large output signals from the computer or involve much wastage of the recording medium, if any, on which the computer's output signals are stored.

In accordance with the present invention, data conversion apparatus includes a number store, input means for algebraically adding to the number held in the store a further number as represented in value and sign by an input signal, timing means for defining repetitive time periods of equal duration, means for representing the sign of the number held in the store, distributing means operable after each such addition for reading out the number then in the store to provide a like number of output pulses spaced substantially uniformly over over one such time period, and sense-indicating means for causing the said output pulses to represent the sign of the number held in said store.

Also in accordance with the invention, data conversion apparatus includes a plurality of number stores each as set forth in the preceding paragraph, said timing means and said distributing means being common to all said stores. In the accompanying drawings.

The invention relies on the fact, referred to above, that where the tool or other moving part has appreciable inertia, the differences between successive values of the incremental distances are small compared with those distances. Hence some of the conversion equipment would be unnecessary and less of the computer's output tape would be wasted if the data which the computer was required to provide were limited to merely these "second-order differences." Just as the first-order differences between successive positions of the tool represent velocity, so these second-order differences between successive velocities represent acceleration.

Accordingly the invention will be described by way of example as applied to convert second-order difference numerical data, as supplied by a digital computer, into pulses for the control of a machine tool along X and Y coordinate axes.

Figure 1:
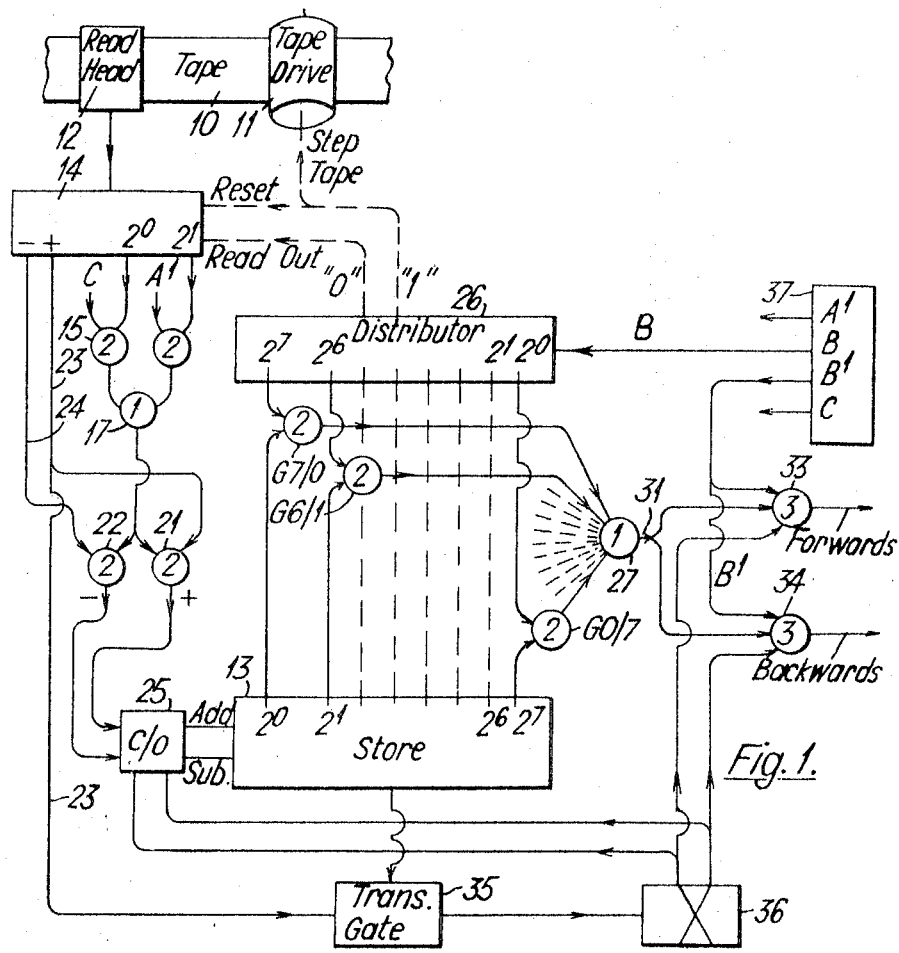
FIG. 1 is a schematic diagram of one embodiment of the invention.
Figure 2:
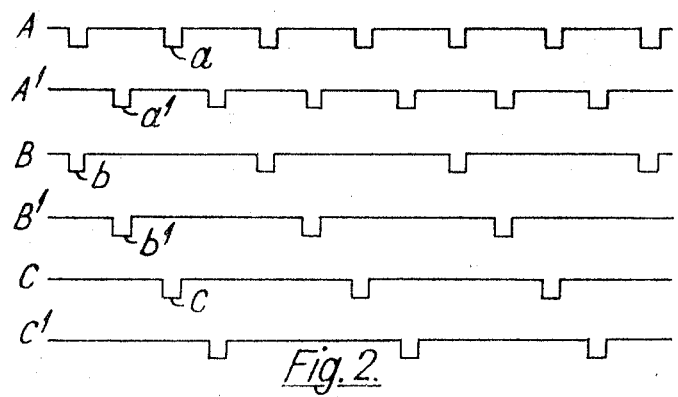
FIG. 2 is a set of waveforms to illustrate the operation of the embodiment of FIG. 1.

In carrying out the invention according to this form, see FIGS. 1 and 2, it is assumed that the computer supplies its output data on a punched tape 10 arranged to be fed by some sort of drive, represented by a roller 11, past a reading head 12. It is further assumed that the second-order differences in respect of each axis are not allowed to exceed an increment of $\pm 3$. Hence the tape carries its information for the X axis on three tracks, two being for the binary value of the incremental number and the third indicating its sign. The information for the Y axis is derived from another three tracks.

The data-conversion apparatus for the X axis includes a number store 13. This store is in effect a reversible binary pulse counter of the kind which counts upwards or downwards according as the pulses to be counted are applied to an Add or to a Subtract rail. The counter has eight stages and is therefore capable of holding a number up to 256 in the decimal scale, and represented by eight binary digits or "bits." The input signal from the computer, as derived from the tape by the reading head 12, is passed to the store by means of input means which include a stage 14 arranged to receive the data (including the indication of the sign) from the reading head and retain it for a short period. Conveniently, stage 14 includes three bistable staticisor units (not shown), one for each of the two digit positions and the third for the sign. Each may be controlled by a photocell or other form of reading pickoff (neither is shown) included in the reading head 12 and responsive only to the signals in the tape track concerned.

The zero digit output $2^0$ from stage 14 is applied as one of the inputs to a two-entry And gate 15. Similarly the units digit output $z^1$ is applied as one entry to another And gate 16. The other inputs to these gates are in the form of signal waveforms C and $A^1$ respectively of FIG. 2, the function and origin of which will be indicated later.

The outputs from gates 15 and 16, after being combined by an Or gate 17, are applied as one of the inputs to each of two further two-entry And gates 21 and 22. The other inputs to these gates are applied over output leads 23 and 24, respectively, from the sign staticisor of stage 14; the arrangement is such that lead 23 is energized when the sign of the signal, as read into stage 14, is positive, and lead 24 when the sign is negative.

The outputs from gates 21 and 22, appropriately labeled "+" and "—" in the drawing, are applied to the Add and Subtract rails of store 13 by way of a double-pole changeover switch 25 the control of which will also be indicated later.

Switch 25 and the system of gates, just described, between it and stage 14 also form part of the input means to the store.

To read out periodically the number held by the store, distributing means are provided in the form of another eight-stage binary counter 26, controlled by waveform B of FIG. 2, together with the gating network, now to be described, which connects the digit stages of the counter and those of the store in inverse pairs to provide the output pulses.

The outputs from the $z^7$ stage of counter 26 and from the inverse stage——that is, stage $2^0$—of the store 13 are applied as the inputs to a two-entry And gate G7/0. Similarly the respective outputs from inverse stages $z^6$ and $2^1$ are applied to an And gate G6/1; and so on. Only those two gates and the last gate G0/7 of the sequence are depicted in the drawing. The outputs from all these eight And gates are applied as the inputs to an Or gate 27.

By means of diode logic networks designed to provide signals at the zero and unit digit conditions of counter 26 a control is exercised over certain of the other equipment, as indicated by the broken lines. Thus when the counter is at zero, it applies a readout signal to stage 14; the ensuing step of the counter, bringing it from 0 to 1, causes it to reset such of the staticisors of stage 14 as have been set in response to the previous signal from the tape and to initiate the tape drive.

The diode logic networks for effecting these controls may be of a conventional kind and are therefore not shown. The readout signal may for example be obtained from an eight-entry And gate to the inputs of which are applied the output from the digit 1 side of the 2° stage of the counter and the outputs from the digit 0 sides of the other stages. Similarly as regards the reset and tape-step signals.

The drive is thus allowed almost the full time of the counter cycle in which to bring the next signal to the reading position before the return of the counter to zero causes that signal to be passed to the store 13. The transfer of each signal from the tape to stage 14 is effected by apparatus in the reading head 12 in known manner under the control of a pulse derived from the associated sprocket hole on the tape.

The output from gate 27 over a lead 31 is applied in parallel as one of the inputs to each of two three-entry And gates 33 and 34. A second entry to each is supplied by waveform $B^1$ of FIG. 2.

The third entries to gates 33 and 34 are for the purpose of controlling the sign represented by the pulses to be delivered by the apparatus. For this purpose an output from the store 13, obtained by a diode logic network (not shown) so as to supply a signal only when the store 13 is at zero—as indicated by all its digit stages holding the zero digit—, is applied to control by means of a transmission gate 35 the application of the positive sign output from stage 14 (supplied over the lead 23) to the trigger input of a bistable stage 36 the two outputs of which, in the usual counterphase with one another, are applied as the respective third inputs to gates 33 and 34.

Stage 36 is the means, above referred to, for representing the sign of the number in the store, and gates 33 and 34, as controlled by stage 36, are the sense-indicating means to cause the output pulses to represent that sign—by the output channel over which they are delivered.

The two outputs of stage 36 are also applied to control changeover switch 25, which conveniently is of the electronic kind; various simple networks of gates are available for this purpose. The way in which stage 36 exercises this control of switch 25 will be made clear from the description of the operation.

The timing control of the apparatus is effected by the signal waveforms of FIG. 2, derived from a local pulse generator 37. Conveniently, the actual signals it generates are those having waveforms A and $A^1$, of which the pulses $a^1$ occur midway between the pulses $a$. Wave B is obtained from alternate pulses of wave A, and wave $B^1$ from alternate pulses of $A^1$. Wave C is formed by the pulses of wave A not used for wave B. It will be seen from the drawing that during each of the intervals between pulses $b$ of waveform B, there occur two pulses $a^1$ of wave $A^1$ and one pulse $c$ of wave C, and that these three pulses are neither coincident nor overlapping. It is assumed that all the gates depicted in FIG. 1 respond to negative-going inputs.

The master signal, defining the rhythm of operation of the whole apparatus, and in particular the repetitive time periods $dt$ of equal duration, is that of wave B, which controls counter 26 direct, and, indirectly, the equipment controlled by the counter as described above. Each negative-going timing pulse $b$ of the wave steps the counter forward by one number. Thus 256 of these pulses are required to step the counter through its full contents, from 0 back to 0. The repetition frequency of these pulses (or rather of wave A, from which they are derived) is chosen to be such that the overall time taken to carry out this complete stepping cycle defines the incremental time $dt$. The pulse repetition frequency of wave B is therefore $256/dt$ pulses per second.

Somewhat similar equipment is provided for control of movement along the Y axis. A brief description will be given later.

Before describing the operation of the apparatus of FIG. 1 as a whole, it may be convenient to indicate briefly the action of the reading means constituted by counter 26 and the associated gates G in reading out the number held in the store 13 to represent the first-order difference.

The counter is designed so that each time one of its digit stages is switched from 0 to 1 by a timing pulse $b$, the stage applies a pulse of convenient length (somewhat less than that of pulses $b$) to the And gate to which that stage is connected. As counted. As counter 26 is a binary counter, only one of its stages at a time will be switched from 0 to 1 as the counter is stepped in the upward direction, as in the present instance.

The gating network is such that only if the store stage paired with that counter stage at the And gate holds digit 1 is an output pulse delivered through OR gate 27 to lead 31. Owing to the inverse system by which the digit stages are paired at the gates, the effect of pulsing stage 26 through a complete cycle is to pass out to lead 31 all the pulses held in the store 13, approximately evenly spaced over the cycle. Thus if the store held 32 pulses, they would be passed out over lead 31 at the rate of one for each eight pulses of wave B. Where the number of pulses in the store is not an exact divisor of 256, the spacing will not be so accurately even.

From lead 31 the pulses pass through whichever of gates 33 and 34 is favorably biased by stage 36. The gate concerned is opened by a pulse only during the presence of a pulse $b^1$ of wave $B^1$, in order to standardize the pulse as supplied to the machine tool.

The operation of the FIG. 1 apparatus as a whole can now be briefly indicated, from the starting condition on which both the store 13 and counter 26 are empty—that is, at zero—, the digit outputs from stage 14 are zero too, and its sign output lead 23 energized, thereby representing the positive sign, and therefore a required forward movement of the tool along the X axis.

The operation is begun by inserting a tape with a blank part under the reading head 12 and switching on the waveform generator. As counter 26 is in its zero condition, it will apply a readout signal to stage 14, but as no signal has as yet been read into it from the tape, this readout instruction is ineffective.

The ensuing $b$ pulses of wave B step counter 26 repetitively through the number 1, thereby advancing the blank tape to the extent of a signal position for each complete cycle of the counter, until the first of the second-order difference signals from the computer has reached the reading head 12. During each of these preliminary cycles the counter also steps once through the number zero, but this has no effect on stage 14 since as yet the stage holds no signal.

Under instructions from the tape itself, as mentioned above, this first signal is read into stage 14 in the form of a three-digit binary signal representing one of the decimal numbers 0 to 3, with a positive or negative sign. The signal effects the appropriate setting of the staticisors of stage 14 so that as soon as the counter has returned to zero at the beginning of the next cycle the readout instruction from the counter alerts gate 15, gate 16, both gates, or neither, according as the decimal value of the signal is 1, 2, 3, or 0. By "alerting" a gate is meant applying an input of the sense for opening the gate if that sense is possessed by the other input or inputs to the gate.

Assuming that the signal is positive, the sign staticisor remains energizing lead 23, thereby alerting gate 21 rather than gate 22. As the store 13 is at present in its zero condition, it is holding gate 35 open, with the result that the signal on lead 23 passes to stage 36 to set it to its Forward condition; the stage accordingly alerts the Forward output gate 33 and holds switch 25 in the condition for connecting the "+" and "−" leads from gates 21 and 22 to the Add and Subtract rails, respectively, of the store 13.

The readout instruction pulse applied by counter 26 to stage 14 begins at the same time as that one of the $b$ pulses which steps the counter to its zero state. As already indicated, each time interval between successive $b$ pulses spans one pulse $c$ and two pulses $a^1$. Hence during that interval stage 14 passes into store 13 by way of one or both of gates 15 and 16, gate 17, gate 21, and switch 25 one pulse $c$, or two pulses $a^1$, or all three pulses, according as stage 14 holds the decimal number 1, 2, or 3. If stage 14 holds zero, no pulse is passed to the store.

The store thus receives at its Add rail during that one $b$ pulse interval one, two, or three pulses, or no pulse, as the case may be, and counts forward to that extent.

The next 255 $b$ pulses step the counter 26 forward to zero, distributing as it does so the number held in the store in the form of the same number of pulses, approximately evenly spaced. Thus if the first signal on the tape represents the number +2, with the result that store 13, when read out by the counter, holds that number, an output pulses is passed through gates 27 and 33 once for every 128 $b$ pulses. These output pulses start the tool moving, at the appropriately slow velocity which is proportional to its maximum velocity in the ratio of the number 2 to the maximum of 255 per cycle of the counter.

During that cycle, stage 14 is reset, the tape advanced, and the new second-order difference signal read from the tape into stage 14. The operation just described is thus repeated, with each new signal added algebraically to the number held in the store. In normal operation the signals to begin with will all be positive, each one increasing the number of output pulses that are delivered per cycle and so steadily accelerating the tool movement to the appropriate working value.

Any negative signals energize lead 24 rather than lead 23 and so transfer the alerting bias from gate 21 to gate 22. Hence the pulses passed by gate 17 are now applied by way of gate 22 and switch 25 to the Subtract rail of the store. This reduces the total held in the store and so reduces the number of pulses that are next delivered. Thus the effect is not to reverse the direction of tool movement but merely to reduce its velocity a little.

So long as store 13 holds a number, and so is not energizing its all-zero input to gate 36, such a change of sign is unable to reach stage 36, which accordingly remains alerting the Forward gate 33 and connecting gates 21 and 22 to the Add and Subtract rails respectively of the store.

Reversal of direction is effected in reliance on the fact that owing to the inertia of the tool it cannot be reversed until its velocity has been slowly reduced to zero. Thus in the example of forward movement described above, a backward movement cannot be effected until sufficient second-order difference signals of negative sign have been passed to the store to reduce its contents to zero, and so open gate 35.

What happens next depends on the sign of the next signal to be read off the tape into stage 14. If the signal is positive, requiring the previous forward movement to be resumed, the resulting energization of lead 23 passes through the open gate 35 to confirm stage 36 in its Forward condition, and no reversal of movement takes place.

If on the other hand the next signal received after the store has been reduced to zero is of negative sign, requiring that the tool should now be moved in the backward direction, the potential level of the now "unenergized" condition of lead 23, as applied to stage 36 through gate 35, is such as to switch the stage to its Backward condition.

This has two results. First, switch 25 is changed over to connect the lead from gate 22 to the Add rail of the store, thereby causing the subsequent negative signal pulses to step the store forward. Second, the alerting bias is transferred from gate 33 to gate 34, thereby causing the resulting output pulses to be of the sense for moving the tool in the backward direction.

If the signals revert to the positive sign, their application by switch 25, in its newly reversed condition, to the Subtract rail of the store causes the count to decrease; and if sufficient positive signals are received a reversal to a forward movement will at length result.

Thus the store represents by its count at any given moment only the numerical value of the velocity, the sense of that velocity—that is, the direction in which it acts——being represented by the condition at that moment of stage 36.

The different effect, under those two conditions of stage 36, which the sign of the signal has on the store content—for example, the positive signals sometimes being added and sometimes subtracted—arises from the fact that as both acceleration and velocity are vector quantities, acceleration acts to increase or decrease the velocity according as their senses are the same or opposite, and regardless of whether the velocity is acting in a "forward" or "backward" direction.

Various details of the apparatus may be modified in accordance with the invention. For example, the counter 26 may exercise the readout control by alerting gates 15 and 16 each of which has now three entries, rather than by influencing stage 14 as described. Counter 26 may alternatively be stepped in the downward direction, from 256 to 0; in such an arrangement the operative change at the counter has to be from digit 1 to digit 0, for in the other direction more than one stage would be switched at the same time in a downward count; further, the paired stage of the store has now to hold digit 0 for an output pulse to be delivered.

Instead of store 13 having a multiple diode network to derive the all-zero signal for application to gate 35, that gate may be a nine-entry And gate, eight of the inputs being derived from the respective digit stages of the stores. The output pulses may represent their sense by some other characteristic than the channel over which they are delivered; they may for example be positive-going to represent the forward direction and negative-going for the reverse direction. In any case they may be recorded, usually on tape, in correct association with the Y bit pulses.

Similar apparatus may be provided to control movement along the Y axis, some at least of the equipment described above for the X axis being arranged to serve also for the Y axis. To ensure the essential degree of coordination between the trains of X and Y bit pulses, the one waveform generator 27 and the same derived waveforms should be used for both axes. Similarly counter 26 of the X axis could also control the like equipment for the Y axis. As standard punched tape can carry both sets of second-order differences signals only one tape and one tape drive are needed. Though separate stores should be supplied, the counter 26 of the reading means might without inconvenience be used to read out from both stores, diodes being inserted in the output leads from the digit stages to prevent unwanted interaction. Apparatus for controlling movement along all three orthogonal axes X, Y, and Z, including arrangements for checking the control system for faults, will be described later with reference to FIG. 4.

Figure 3:
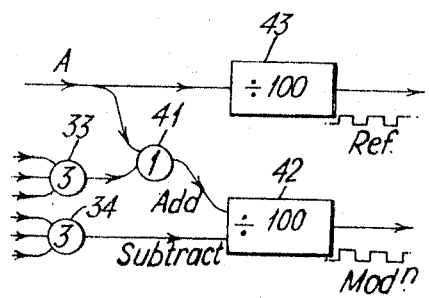
FIG. 3 is a schematic diagram of auxiliary equipment for use with the embodiment of FIG. 1.

Certain kinds of machine tool require to be supplied with control data in some other form than that of bit pulses representing incremental movements. Suitable conversion equipment is then required. Where for example the tool requires the control data for each axis to be in the form of a square or sinewave signal the phase of which varies relative to that of a reference signal, as disclosed in British Pat. specification No. 843,406, the conversion equipment may be as shown in FIG. 3.

The train of pulses from gate 33 is applied with the A waveform to an Or gate 41 the output of which is connected to the Add input of a bidirectional counter 42. The train of output pulses from gate 34 is applied to the Subtract input. The A waveform is also applied to the input of a monodirectional counter 43. Both counters are of the "divide by a hundred" kind. Thus where the repetition frequency of wave A is 10 kc./s., the output from counter 43 is a signal of waveform at 100 c./s. Similarly with counter 42. At gate 41 the output pulses from gate 33 are added to the pulses $a$ of waveform A. As the output pulses, where present, are in the form of pulses $b^1$ of wave B, and as pulses $a$ and $b^1$ never coincide—see FIG. 2—there will be no pulse loss through pulses reaching the gate at the same time. The pulses from gate 34 delivered to the Subtract input of counter 42 are also $b^1$ pulses; but they can never coincide with pulses at the Add input as they are again in noncoincidence with pulses $a$, and cannot occur with the $b^1$ pulses from gate 33 as that would be tantamount to an instruction to the tool to move forwards and backwards at the same time.

The effect of the output pulses from gate 33 being added to those of wave A is to cause the output waveform from counter 42 to be of shorter wavelength than that of the output from counter 43 and hence to be modulated in frequency and phase with respect to the reference waveform. Similarly a train of Subtract pulses causes the waveform from counter 42 to increase in length and decrease in frequency with respect to the reference. Thus the directions of tool movement is represented by the sense of the modulation. The reference is derived from the $a$ pulses, which have twice the frequency of the $b^1$ pulses—see FIG. 2—, to ensure that at the maximum tool velocity, when an output pulse is supplied for each cycle of the B waveform, the extent of modulation does not exceed the desirable maximum of 50 percent.

A checking system applicable to apparatus for controlling movement in each of X, Y, and Z orthogonal directions will now be described with reference to FIG. 4.

Figure 4:
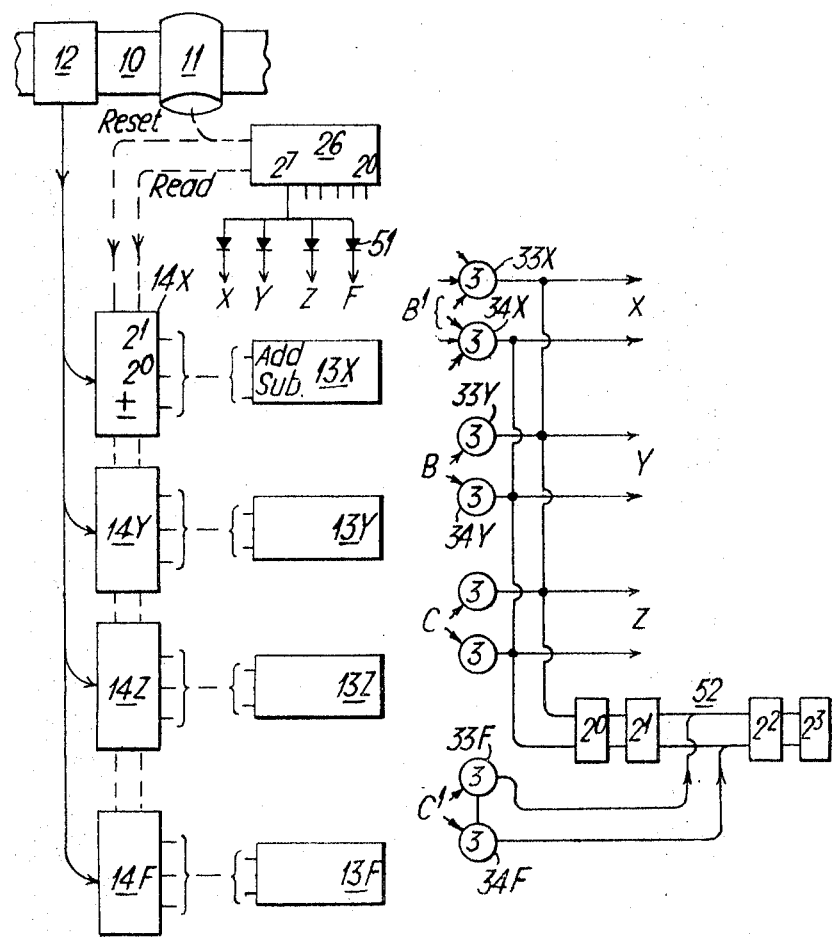

Each of the X, Y, and Z channels is provided with a staticisor stage corresponding to stage 14 of the arrangement of FIG. 1 and in the present arrangement identified in FIG. 4 by the references 14X, 14Y, and 14Z. A similar stage 14F is provided for the fault-checking channel. To all four stages the reading head 12 applies the signals from the corresponding tracks of the tape.

As each channel requires three tracks (for digits $2^0$ and $2^1$ and the sign signal) some time-sharing or other method of tape utilization will be necessary where the standard eight-track tape is used. For example, signals representing X and Y could alternate with signals representing Z and F. In each case there would be at least one track spare, and that could carry a signal coded to differentiate between the respective pairs.

Channel X includes equipment corresponding to that of FIG. 1 and indicated in FIG. 4 by the previous reference followed by the letter X—for example, a store 13X, output gates 33X and 34X, and so on. The store 13X is controlled over its Add and Subtract inputs by a gating network corresponding to that of gates 15, 16, 17, 21 and 22 of FIG. 1 but omitted from the present drawing for clarity.

Similar equipment is provided for each of the other channels, with the references including the letter Y, Z, or F as the case may be. As mentioned above when referring to equipment for only X and Y direction the counter 26 is used as distribution means common to the stores 13. Thus in the present arrangement the output lead from digit stage $2^7$ of the counter is applied in parallel by way of diodes 51 and leads X, Y, Z, and F to the And gates (not shown) associated with the digit $2^0$ outputs of the respective stores. The counter also controls all the stages 14 over Reset and Read out leads much as it controlled stage 14 in the arrangement of FIG. 1, and similarly controls the stepping of the tape drive.

The three pairs of output leads from the gates 3 and 34 of the X, Y, and Z equipment are tapped off in parallel to provide Add and Subtract inputs to a four-stage fault-checking binary counter 52, to which is also applied the output from gates 33F and 34F of the fault-checking equipment.

To prevent pulses from missing the counter 52 because to pulse overlaps or coincidence, gates 33 and 34 in the Y and Z channels are controlled not by waveform $B^1$ as are gates 33X and 34X but by waveforms B and C, since their respective pulses $b$ and $c$ never coincide with pulses $b^1$—see FIG. 2.

Similarly, to prevent any output pulse of the F channel from being lost through coincidence with a pulse in one of those other channels, a waveform $C^1$ is derived (in stage 37—FIG. 1) from those $a^1$ pulses which are omitted from waveform $B^1$, and is applied to control gates 33F and 34F.

The other inputs to the various gates 33 and 34 from the corresponding Or gates and sign-representing stages are as shown with respect to gate 27 and stage 36 in FIG. 1 and are here omitted for clarity.

To effect the checking, the computer is programmed to calculate the algebraic sum of the pulses which are to be delivered over the three channels X, Y, Z during each time period $dt$ and supplies, over the F tracks of the tape, pulses the number and sense of which when applied to the store 13F from stage 14F cause the store to hold a number which makes the algebraic total held in all four stores approximately zero.

Assuming that all four stores 13 have the same capacity, there may be a danger of store 13F becoming swamped by the pulses necessary to balance the algebraic sum of the contents of the other three stores. Thus if the tool were being driven along each of the three coordinates in the same direction—forward, say—at nearly maximum velocity, the total of output pulses from the X, Y, and Z equipments during each time period $dt$ might well amount to over 700 (assuming as before a store capacity of 255), which would be far beyond the capacity of store 13F.

To obviate this danger, therefore, the computer may be programmed to divided by, say, four, the algebraic total of the X, Y, and Z pulses, and maintain store 13F holding the quotient. To provide the correct number for application to counter 52, the output pulses from the F equipment are effectively multiplied by four by being applied to the counter between its digit stages $2^1$ and $2^2$.

In operation, during each time period $dt$, each of the X, Y, and Z equipments deliver its output pulses, of appropriate number and sense, spaced approximately evenly over that period but never coinciding with the pulses from the other equipment. Over that same period, the F equipment supplies the check number of pulses, also evenly spaced. So long as there is no appreciable error in the tool-control system, the number held in counter 52 remains approximately zero. Conversely, any such error causes a substantial departure from zero. If desired, some sort of alarm or other error response may be provided and arranged to be actuated by the counter on such departures from zero.

The store and distributor may alternatively be shift registers or circulating pulse stores. The arrangement of FIG. 1 modified by the replacement of store 13 and distributor 26 each by a circulating pulse store, and taking the more general case of an $n$-bit store, will now be described with reference to FIG. 5, in which the components which correspond to those of FIG. 1 are given their previous correspond to those of FIG. 1 are given their previous reference numerals.

Store 13 of FIG. 1 is replaced by an $n$-bit circulating pulse store 61 of which the adder is indicated at 62 and the store itself at 63 with the feedback loop connection 64 from the store back to the adder. Similarly the distributor 26 of FIG. 1 is replaced by an $n$-bit circulating pulse store 71 having an adder 72, store 73, and feedback loop 74. A clock pulse generator 81 delivering $n$ pulses for each pulse of wave B (FIG. 2, where $n$ was assumed to be 8) keeps both stores circulating an $n$-bit serial binary signal in exact synchronism with one another.

The binary digital signal from Or gate 17 is applied direct to adder 62 and supplies 0, 1, 2, or 3 pulses from the staticisors of stage 14 much as before; this time, however, the control of gates 15 and 16 is by waveforms $D_0$ and $D_1$ n-bit have the same pulse repetition frequency of wave B (now $2^n$ pulses per time $dt$) but are phased so as to ensure that the signals from gate 17 synchronize with the arrival at the adder 62 of the $2^0$ and $2^n$-bit bit positions of the circulating signal.

Store 61 is tapped off at the adder output to provide an input to adder 72 of distributor 71. Store 71 is tapped off at the adder output to provide over lead 31 the signal for gates 33 and 34. These gates are controlled by bistable stage 36 as before to represent the sign of the number held in store 61 and so determine into which of the Forwards and Backwards channels the output pulses are directed. Inputs to these gates are provided by wave $B^1$ as before, except that this time the wave is applied to gate 34 by way of an inhibitor gate 82 controlled by the output from the distributor 71 so that the $B^1$ pulses $b^1$ are supplied to the Backwards channel only in the absence of an output pulse from the distributor. Gate 34 is now a two-entry gate.

The sign-representing leads 23 and 24 from stage 14 are applied to adder 62 to determine whether the pulses from gate 17 are added to or subtracted from the number circulating in store 61.

Lead 23 is connnected as before to stage 36 by way of a transmission gate 35; but this time the gate is controlled by adder 62 so as to be opened momentarily when the number held by the store passes through zero on a change in direction of add" tool movement. Thus if the store is holding a number representing a velocity in the forward direction, and decelerating pulses from stage 14 are repetitively subtracted from it, with the intention of eventually reversing the tool movement, the first pulse to be subtracted after the store has been reduced to zero sets up in the store, not the number 1, representing a very small velocity, but the complementary number ($2^n-1$). Further negative pulses, representing acceleration in the backward direction, are subtracted from this. Similarly if the tool movement is reversed from backward to forward: successive "add" pulses increase the complement to the ($2^n-1$) value, whereupon the next pulse changes the store content to zero. It is from these large changes of the store content from zero to ($2^n-1$) or vice versa that the signal is derived for opening gate 35 to allow the sign staticisor of stage 14 to switch stage 36.

It is because the stored number represents the complement of the real number during backward movement that wave $B^1$ is applied to gate 34 by Inhibit stage 82. Thus if the real number is $x$, representing a particular velocity in the backward direction, the number held in store 61 will be ($2^n-x$). Distributor 71 will therefore be closing gate 82 ($2^n-x$) times in each time period $dt$. During each such period there will be $2^n b^1$ pulses. Hence the number of pulses delivered by gate 34 to the Backwards channel will be $2^n-(^n-x)$—that is, the true number $x$.

The arrangements for stepping the tape drive and the readout from stage 14 are not shown. These controls may be exercised by the distributor, much as in FIG. 1, or by waveforms derived from the master waveform A (FIG. 2) in any convenient manner.

In operation, the rate set by clock 81 ensures that the contents of store 61—N, say—entered into distributor 71 $2^n$ times during each period $dt$. During this period, therefore, the distributor receives a total number of $2^n N$ pulses; as it can hold only $2^n$ pulses, it accordingly overflows N times, each overflow resulting in the emptying of the store and the delivery of a single output pulse over lead 31 to gate 33 or 82 (in dependence on whether N is a real or complementary number). Thus in each period $dt$, the N pulses representing the contents of store 61 are evenly distributed.

In multichannel arrangements, the distributor 71 may be made common to all channels as is distributor 26 in the arrangement of FIG. 4.

Figure 5:
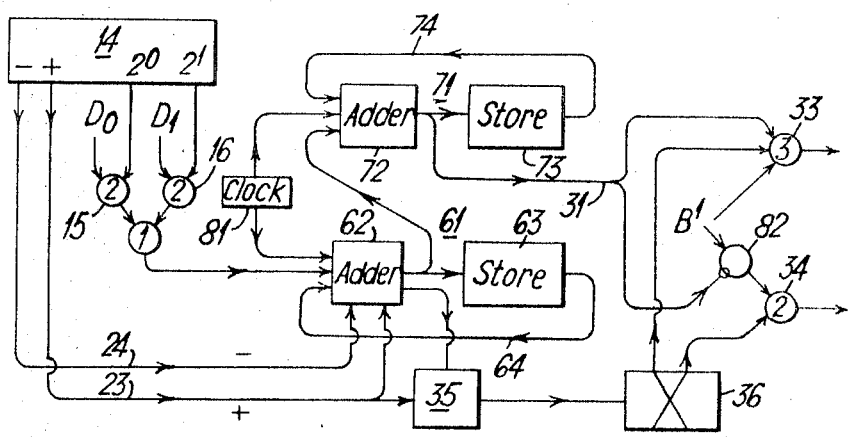
FIGS. 4 and 5 show parts of the arrangement of FIG. 1 modified in accordance with two further embodiments of the invention.

The use for the store and distributor of shift registers need not be described since such an arrangement will readily be devised once the principal of operation embodied by the arrangements of FIGS. 1 and 5 is grasped.

Among other alternatives, the second-order difference data may be received from the computer on magnetic tape, instead of punched tape, or may even by supplied by the computer direct.

What we claim is:

1. Data conversion apparatus including a number store, input means for algebraically adding to the number held in the store a further number as represented in value and sign by an input signal, timing means for defining repetitive time periods of equal duration, sign-representing means for representing the sign of the number held in the store, distributing means operable after each such addition for reading out the number then in the store to provide for reading out the number then in the store to provide a like number of output pulses spaced substantially uniformly over one such time period, and direction controlling means for enabling an output channel so as to cause said output pulses to represent the sign of the number held in said store by the output channel over which they are delivered.

2. Apparatus as claimed in claim 1 wherein the store is in the form an $n$ stage binary counter and the distribution means includes a second $n$ stage binary counter, means for applying timing pulses to the second counter to step it upwards from zero to its full capacity of $2^n$ pulses during each of said time periods, and a gating network which so connects the digit stages of the second counter and those of the store in inverse pairs to the direction controlling means that on the stepping by a said timing pulse of any stage of the second counter from digit nought to digit one a said output pulse is delivered provided that the store digit stage which is paired with that counter stage holds digit one.

3. Apparatus as claimed in claim 1 wherein the store is in the form of an $n$ stage binary counter and the distribution means includes a second $n$ stage binary counter, means for applying timing pulses to the second counter to step it downwards from its full capacity of $2^n$ pulses to zero during each of said time periods, and a gating network which so connects the digit stages of the second counter and those of the store in inverse pairs to the direction controlling means that on the stepping by a said timing pulse of any stage of the second counter from digit one to digit nought a said output pulse is delivered provided that the store digit stage which is paired with that counter stage holds digit nought.

4. Apparatus as claimed in claim 1 wherein the store is an $n$-bit store and the distribution means includes a second $n$-bit store, means for algebraically adding the contents of the first-mentioned store to the second store $2^n$ times during each of said time periods, and means for deriving a said output pulse each time the second store empties on becoming filled to capacity.

5. Apparatus as claimed in claim 1 wherein the sign-representing means includes a bistable stage arranged to represent the respective signs by its stable states and to be switched from one state to the other as the contents of said first-mentioned store pass through zero on the instructions of an input signal requiring a change of sign.

6. Apparatus as claimed in claim 1 wherein the direction controlling means includes gating stages arranged to be controlled by said means for representing the sign of said number so as to direct each output pulse into one or other of two output channels in dependence on that sign.

7. Data conversion apparatus including a plurality of number stores, for each number store input means for algebraically adding to the number held in the store a further number as represented in value and sign by an input signal, and sign-representing means for representing the sign of the number held in the store, and common to all said stores timing means for defining repetitive time periods of equal duration together with distributing means operable after each such addition to all the stores for reading out the number then held in each store to provide over an output channel individual to that store a number of output pulses equal to the number held by that store and spaced substantially uniformly over one such time period, each store being further provided with direction controlling means for enabling an output channel so as to cause associated output pulses to present the sign of the number held in that store by the output channel over which they are delivered.

8. Apparatus as claimed in claim 7 including a generator of gate-controlling waveforms together with gating stages in said channels arranged to be operated by those waveforms to ensure that the pulses in any channel do not overlap in time with the pulses in any of the other channels.

9. Apparatus as claimed in claim 8 including a pulse counter arranged to add together algebraically all the pulses delivered by all the channels and provide a fault indication when the sum differed from a predetermined value.

PO-1050
(5/69)

UNITED STATES PATENT OFFICE
CERTIFICATE OF CORRECTION

Patent No. 3,597,593          Dated August 3, 1971

Inventor(s) Arthur Owen Stanesby et al.

It is certified that error appears in the above-identified patent and that said Letters Patent are hereby corrected as shown below:

Column 1, line 38, "x" should be --X--; line 44, after "invention" insert --is to provide data conversion apparatus for converting--; lines 60 and 61, "over over" should be --over--; column 2, line 50, "z" should be --2--; line 74, "z" should be --2--; column 3, line 2, "z" should be --2--; column 4, lines 19 and 20, cancel "As counted"; column 5, line 23, "pulses" should be --pulse--; column 6, line 33, "stores" should be --store--; line 74, "kc./s." should be --kc/s--; column 7, line 64, "3" should be --33--; column 8, line 27, "thealgebraic total ofthe" should be --the algebraic total of the--; lines 52 and 53, cancel "correspond to those of Fig. 1 are given their previous"; line 66, "n-bit" should be --which--; line 69, "$2^n$" should be --$2^1$--; line 70, cancel "bit" first occurrence; column 9, line 1, "whichofthe" should be --which of the--; line 4, "inhibitor" should be --Inhibitor--; line 17, "add"" should be --the--; line 42, "$2^n-(^n-x)$" should be --$2^n-(2^n-x)$; line 51, after "say-" insert --are--; line 69, "by" first occurrence, should be --be--.

Signed and sealed this 28th day of March 1972.

(SEAL)
Attest:

EDWARD M. FLETCHER, JR.          ROBERT GOTTSCHALK
Attesting Officer          Commissioner of Patents